United States Patent [19]

Engel

[11] Patent Number: 5,717,303

[45] Date of Patent: Feb. 10, 1998

[54] DC MOTOR DRIVE ASSEMBLY INCLUDING INTEGRATED CHARGER/CONTROLLER/ REGENERATOR CIRCUIT

[75] Inventor: Gabriel D. Engel, Ames, Iowa

[73] Assignee: Tenergy, L.L.C., New Britain, Conn.

[21] Appl. No.: 610,294

[22] Filed: Mar. 4, 1996

[51] Int. Cl.[6] ............................................. H02B 3/00
[52] U.S. Cl. ........................ 318/376; 318/139; 320/9; 307/56
[58] Field of Search ............................ 318/370–376, 318/105–109, 139, 440–442; 180/65.1, 65.3, 65.4; 307/46.47, 48.56, 52.58, 64–67; 320/2, 4, 5, 9, 10, 11, 44, 12, 13, 43, 48; 322/13, 14, 15, 28, 29; 323/259, 260; 363/41, 52, 54, 19, 21, 102, 164, 174, 175

[56] References Cited

U.S. PATENT DOCUMENTS

| | | |
|---|---|---|
| 3,559,025 | 1/1971 | Burkett et al. . |
| 3,665,221 | 5/1972 | Wickliff . |
| 3,793,578 | 2/1974 | Rettig . |
| 3,943,423 | 3/1976 | Hoffman . |
| 3,974,660 | 8/1976 | Farr . |
| 4,085,358 | 4/1978 | Holcomb . |
| 4,088,937 | 5/1978 | Uchida et al. .................. 318/441 |
| 4,142,135 | 2/1979 | Fujita ............................ 318/139 |
| 4,258,304 | 3/1981 | Bourke . |
| 4,292,578 | 9/1981 | Steigerwald et al. . |
| 4,366,388 | 12/1982 | Wilkerson . |
| 4,401,926 | 8/1983 | Morton et al. . |
| 4,409,525 | 10/1983 | Hartwig ......................... 318/139 |
| 4,450,388 | 5/1984 | Markham . |
| 4,465,955 | 8/1984 | Lössel et al. . |
| 4,491,768 | 1/1985 | Slicker . |
| 4,602,322 | 7/1986 | Merrick . |
| 4,626,750 | 12/1986 | Post . |
| 4,654,776 | 3/1987 | Basire . |
| 4,819,147 | 4/1989 | Bingham . |
| 4,920,475 | 4/1990 | Rippel . |
| 5,055,994 | 10/1991 | Schoofs . |
| 5,099,186 | 3/1992 | Rippel et al. . |
| 5,119,011 | 6/1992 | Lambert ........................ 320/43 |
| 5,332,954 | 7/1994 | Lankin . |
| 5,341,075 | 8/1994 | Coccont . |
| 5,466,998 | 11/1995 | Kinoshita et al. .............. 318/375 |
| 5,500,579 | 3/1996 | Kim et al. ..................... 318/139 |
| 5,565,760 | 10/1996 | Ball et al. ..................... 318/493 |

*Primary Examiner*—Jonathan Wysocki
*Attorney, Agent, or Firm*—Pepe & Hazard

[57] ABSTRACT

A drive assembly comprises a DC electric motor and an integrated charger/controller/regenerator which includes a power module, a step-up module and a control circuit. The input of the power module is connected to an electric power source during charging, and to the DC motor during regenerative braking. The input of the step-up module is connected to the power module, and the output is connected to the battery. The control circuit includes a switch, and has three modes of operation: driving, regenerative braking and charging. During driving, the switch connects the battery to the power module input and the power module output to the DC motor. During regenerative braking, the switch connects the DC motor to the power module input and the power module output to the step-up module input, and the step-up module output charges the battery. During charging, the switch connects the power module output to the step-up module input, and the step-up module output charges the battery.

7 Claims, 4 Drawing Sheets

DC MOTOR DRIVE ASSEMBLY INCLUDING INTEGRATED CHARGER/CONTROLLER/ REGENERATOR CIRCUIT

BACKGROUND OF THE INVENTION

This invention relates generally to drive assemblies including a DC motor, battery and charger, and, more particularly, to such a drive assembly which includes an integrated electronic charger/controller/regenerator.

Conventional battery operated motors utilize separate battery chargers and motor controller circuits. Although these circuits may utilize similar components, the controller and the charger are not operated at the same time. Separate chargers and controllers increase the number of components, cost, size, and weight which is especially critical in the design of electrically powered vehicles.

Recently, integrated battery charger and motor controllers have been developed. Exemplary of such devices are those illustrated in Ripple U.S. Pat. Nos. 4,920,475 and 5,099,186, Slicker U.S. Pat. No. 4,491,768 and Coconi U.S. Pat. No. 5,341,075. The integrated charger/controllers of these patents are directed to single phase battery chargers and polyphase AC electric motor controllers. In comparison to a single phase DC motor, a polyphase AC motor requires a relatively more complex device to generate the rotating magnetic field which operates the motor. Moreover, polyphase AC motor controllers should not be used to drive single phase DC motors.

Conventional high voltage AC drive systems require battery voltages in excess of 162 VDC (115 VAC) or 325 VDC (230 VAC) in order to operate effectively. However, this high voltage potential creates a high capacitance and requires added insulation to decrease stray capacitance (leakage). Moreover, higher voltage potential inherently increases the risk of shock hazard injuries to operators. Furthermore, high voltage systems require many battery cells in combination to operate effectively. However, the practice of connecting many cells in combination generally places greater stress on individual cells and amplifies minor differences in internal resistance which together may cause both capacity losses and premature failure of the overall drive system.

In addition, it is often desirable to provide for the regeneration of the power during braking of DC motors in order to increase the range of battery powered electric vehicles in which DC motors are employed. During regenerative braking, the direction of the flow of electrical power from the battery to the DC motor during driving is reversed by either maintaining the direction of current flow constant while reversing the voltage polarity, or by reversing the direction of current flow while maintaining the polarity of the voltage. Conventional integrated charger/controllers utilize separate electronic circuits such as free wheel diodes and bridge circuits to enable regeneration.

Accordingly, it is an object of the present invention to provide a novel electric drive assembly for vehicles which include an integrated battery charger, DC motor controller, and regenerator circuit during braking.

It is also an object to provide such a drive assembly which utilizes a low power battery and a single phase DC electric motor.

Another object is to provide such a drive assembly which is relatively simple in construction and reliable in operation.

A further object is to provide a novel method for charging a battery and controlling a DC electric motor for driving a vehicle.

SUMMARY OF THE INVENTION

It has now been found that the foregoing and related objects may be readily attained in a drive assembly comprising a DC electric motor and an integrated charger/controller/regenerator for controlling the DC electric motor in a drive mode of operation, for charging a battery in a regenerative braking mode of operation, and for connection to an electric power source for charging the battery in a charge mode of operation. The integrated charger/controller/regenerator includes a power module, step-up module and control circuit. The input of the power module is connected to an electric power source during the charge mode of operation, and to the DC motor during the regenerative braking mode of operation. The power module includes a transformer to reduce the input voltage of the power source during the charge mode of operation.

The input of the step-up module is connected to the power module, and the output is connected to the battery. The control circuit includes switch means having three modes of operation: driving, regenerative braking and charging. During driving, the switch means connects the battery to the input of the power module and the output of the power module to the DC motor to control the DC motor. During regenerative braking, the switch means connects the DC motor to the input of the power module and the output of the power module to the input of the step-up module, and the output of the step-up module is connected to the battery to charge it. During charging, the input of the power module is connected to the electric power source, and the switch means connects the output of the power module to the input of the step-up module, and the output of the step-up module is connected to the battery to charge it.

Preferably, the step-up module includes the transformer, a transistor, and diode, the transistor being connected in parallel with the diode and connected in series with the transformer. Generally, the power module also includes another transistor connected in parallel with both the diode and the transistor of the step-up module, and the other transistor controls the DC current output of the DC motor during the regenerative braking mode of operation.

Desirably, the power module includes the transistor of the step-up module which is closed, and the other transistor is pulse width modulated to control the DC current output of the DC motor during the regenerative braking mode of operation.

Preferably, the power module is a programmable pulse width modulated converter having power transistors and a parallel/series switching system which connects the power transistors in series during the charge mode of operation. These power transistors rectify the AC current input to the DC current output of the power module and the parallel/series switching system connects the power transistors in parallel during the drive mode of operation to control the associated DC motor.

Desirably the power module includes another diode connected in parallel with the other transistor, and the control circuit pulse width modulates the transistor of the step-up module to periodically short circuit the transformer to allow current to flow through the other diode and charge the battery during the charge mode of operation.

Preferably, the control circuit pulse width modulates the other transistor and closes the transistor of said step-up module to periodically short circuit the DC motor to reverse the direction of the current to charge the battery during the regenerative braking mode of operation.

Generally, the transformer is a toroidal transformer, and the voltage of the output of the step-up module is not greater than 100 volts.

DETAILED DESCRIPTION OF THE PREFERRED EMBODIMENTS

Figure 1:
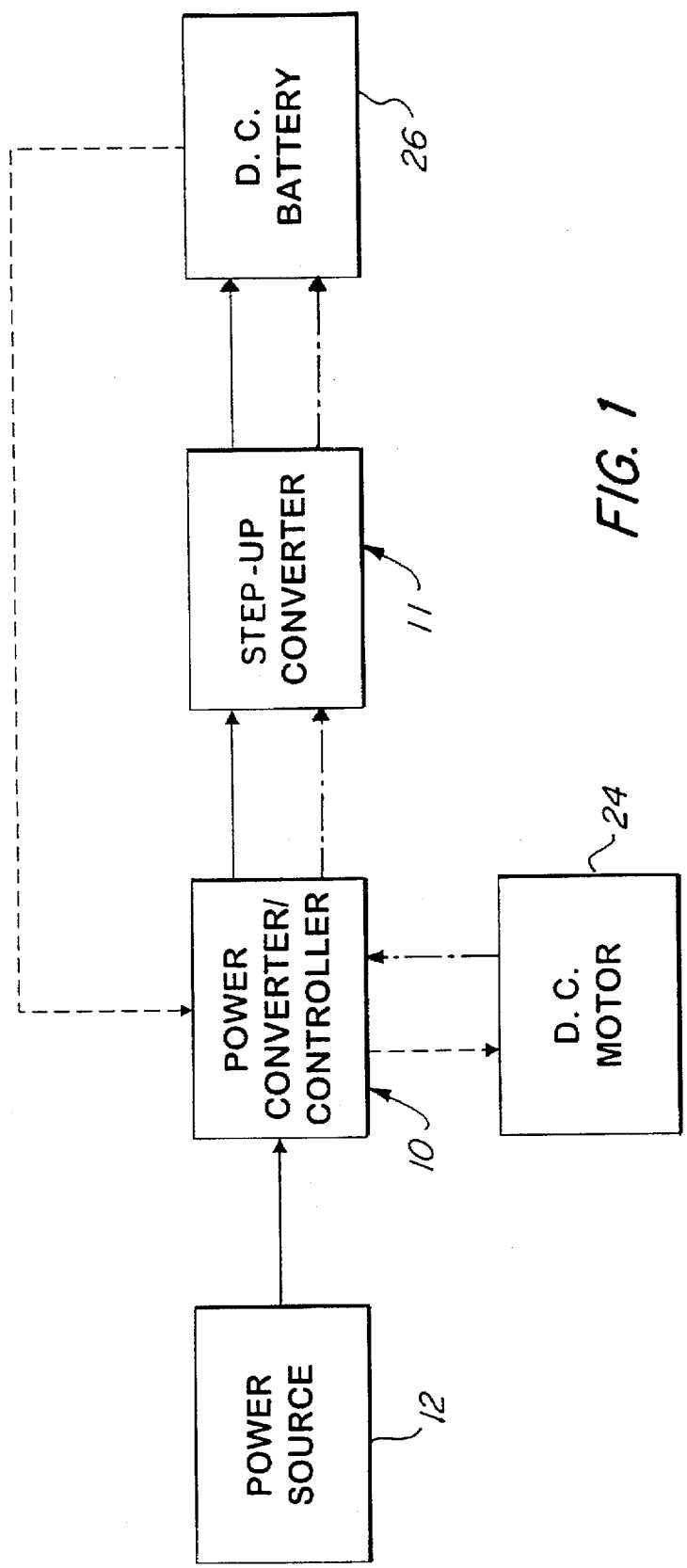
FIG. 1 is a block diagram of a drive assembly embodying the present invention.

Turning first to FIG. 1, this block diagram illustrates a drive assembly embodying the present invention as comprised of a DC motor 24 which derives power through a power controller 10 from a battery 26. The power controller 10 also channels power from an electric power source 12, which may be either AC or DC, to the battery 26 through a step-up converter 11. The integrated charger/controller/regenerator has three modes of operation: (1) a charge mode as indicated by the solid arrows; (2) a drive mode as indicated by the dashed arrows; and (3) a regenerative braking mode as indicated by the dash-dot arrows in FIG. 1.

During the charge mode of operation, the input of the power controller 10 is connected to either a DC or an AC electric power source 12 and the output of the power controller 10 supplies DC current. If an AC power source is used, the power controller 10 rectifies the AC current input to produce a DC current output; if a DC power source is used, the DC current would flow unrectified through the power controller 10. The voltage of the DC current from the power controller 10 is then raised by a step-up converter 11 to a voltage level which slightly exceeds the voltage rating of the battery 26, which is below 100 volts.

Once the battery 26 is sufficiently charged, the drive mode may commence during which the DC current from battery 26 is controlled by the power controller 10 to supply a single phase DC voltage to drive the DC motor 24.

During the regenerative braking mode, the power controller 10 in conjunction with the step-up converter 11 reverses the flow of current from the DC motor 24 while maintaining the polarity of the voltage to charge the battery 26.

Thus, the integrated power charger/controller/regenerator performs the functions of voltage conversion during the charge mode of operation, voltage regulation during the drive mode of operation, and regenerative braking during the regenerative braking mode of operation.

Figure 2:
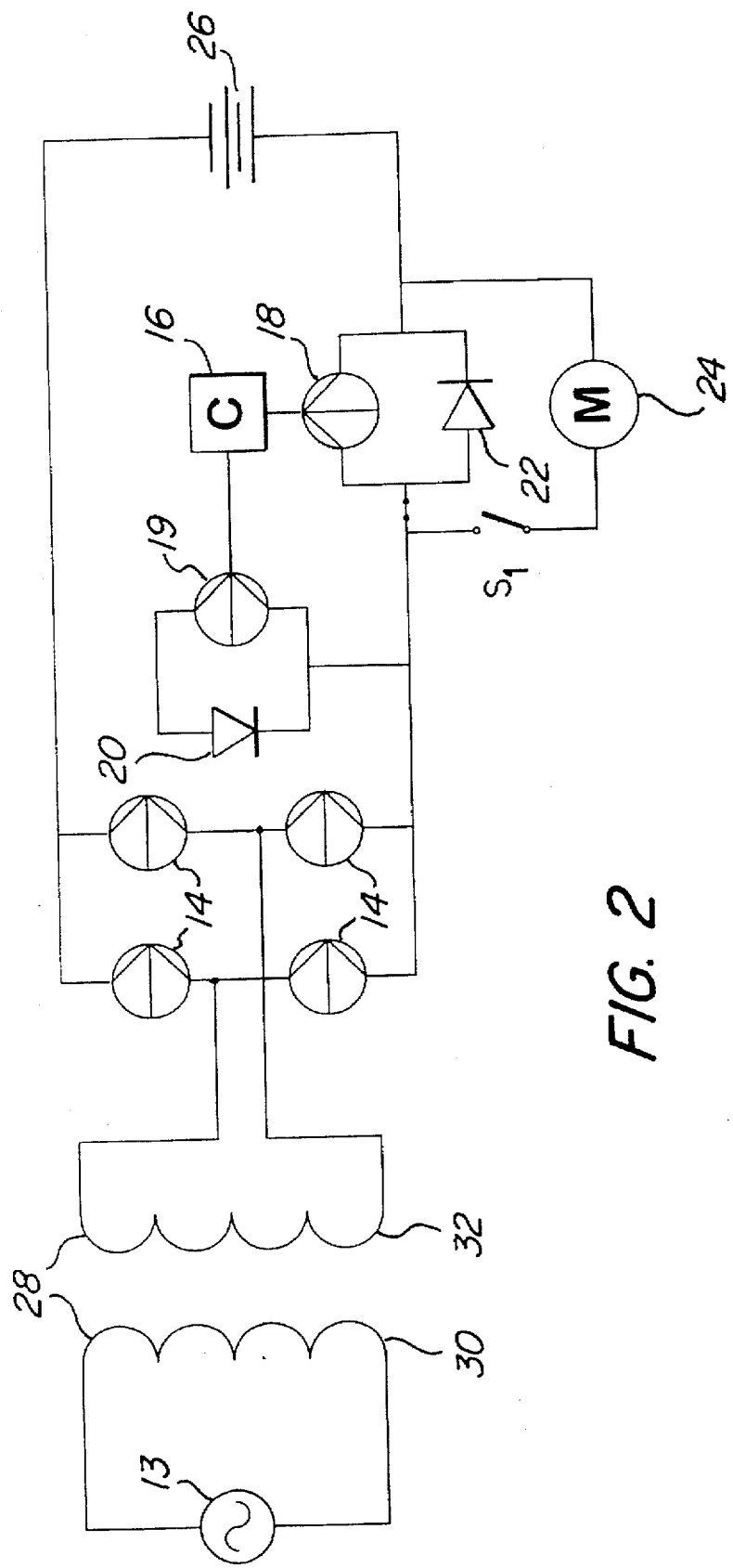
FIG. 2 is a circuit diagram of the integrated charger/controller/regenerator of the present invention in which the high voltage power transistors of the pulse width modulator are connected in series to rectify the AC input during the charge mode of operation.

Turning next to FIG. 2, therein schematically illustrated is the circuitry of the integrated charger/controller/regenerator of the present invention during the charge mode of operation. The AC power source 13 is connected to the primary winding 30 of the voltage transformer 28, and the voltage of the AC power source 13 is lowered through the secondary winding 32 of the voltage transformer 28. The transformer 28 isolates the AC power source 13 from the battery 26 to reduce the potential of a hazardous shock. Moreover, the voltage transformer 28 is a toroidal transformer whose size is substantially reduced compared to conventional transformers because it utilizes the existing charge control circuitry to decrease the duty cycle, thus allowing the toroidal transformer 28 to charge at higher power levels than rated without overheating.

The transformer 28 lowers the voltage of the AC power source 13 significantly to reduce capacitance losses and shock hazard. The AC power source 13 current is rectified by the power transistors 14 which are connected in series during the charge mode of operation. The power controller 10 includes a programmable pulse width modulator (PWM) which, in turn, includes the power transistors 14, a microprocessor control circuit 16, a power transistor 18 with an intrinsic diode 22, a power transistor with an intrinsic diode 20, and electronic switch S1.

During the charge mode of operation, the battery 26 is connected to the DC output of the step-up converter 11. The rectified voltage output of transistors 14 is then raised to the charging voltage level for the battery 26 by the step-up converter 11. The step-up converter 11 includes the power transistor 19 connected in parallel to the diode 20 and utilizes the inherent inductance of the transformer 28. The transformer 28 eliminates the need for an additional inductor and is also smaller and lighter than a conventional inductor.

The switching transistor 19 is connected in parallel to the diode 20, and the two are a part of the same transistor. During the charge mode of operation, the pulse Width Modulated (PWM) microprocessor control circuit 16 pulse width modulates the switching transistor 19 to periodically short circuit the transformer 28 to allow the current to flow through the diode 22 to charge the battery 26.

Figure 3:
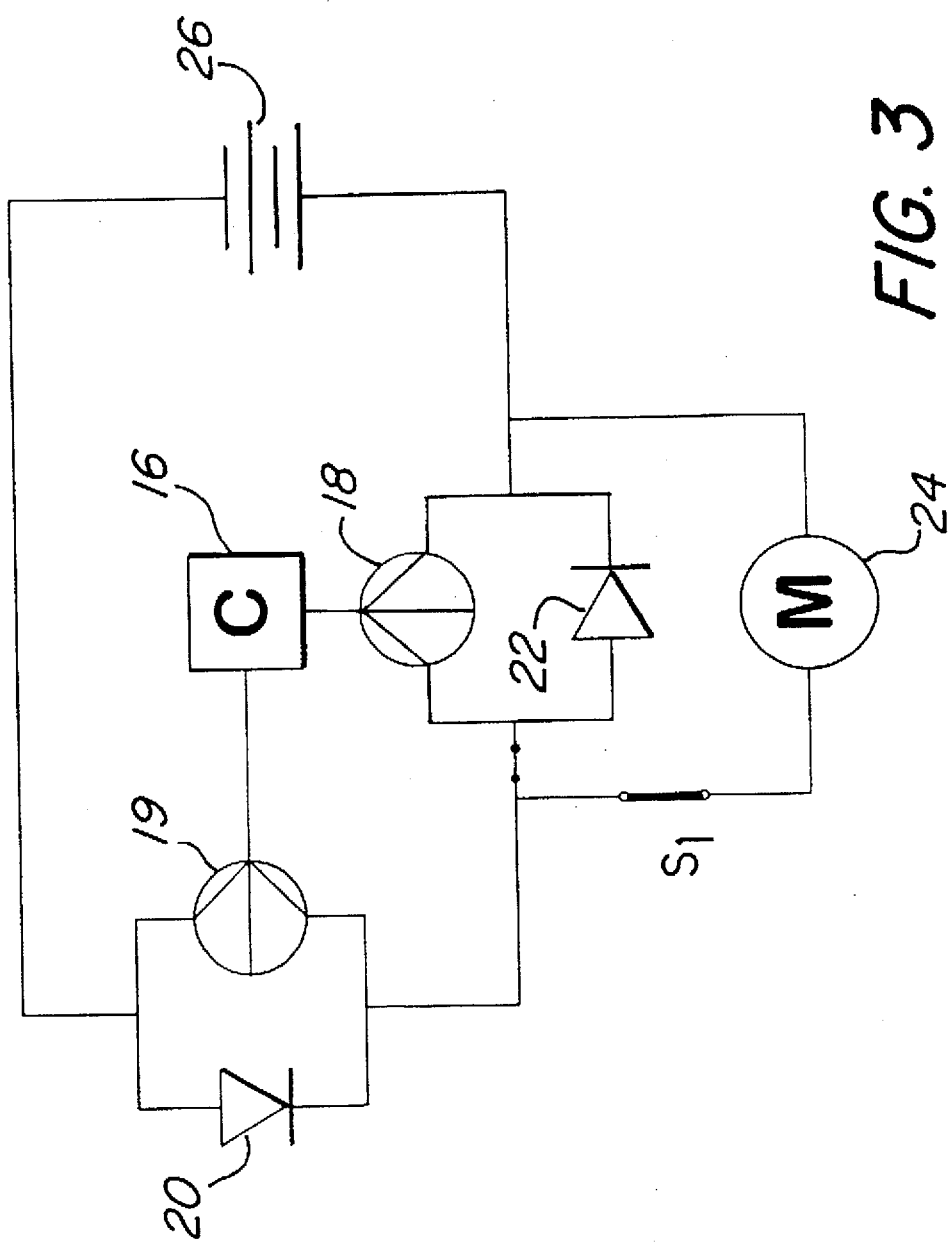
FIG. 3 is a circuit diagram of the integrated charger/controller/regenerator during the drive mode of operation, in which the pulse width modulated transistor is connected across the terminals of the DC Motor to reverse the flow of current during the regenerative braking mode of operation.

Turning next to FIG. 3, the schematic circuit diagram shows the integrated charger/controller/regenerator of the present invention during the drive mode of operation. The pulse Width Modulated (PWM) microprocessor pulse width modulates the power transistor 19 and opens the power transistor 18 during the drive mode of operation. The switch S1 is closed to connect the DC battery 26 to the power transistor 19 which provides a controlled voltage output to drive the motor 24.

The regenerative mode of operation is also illustrated in FIG. 3. During this mode, the PWM microprocessor control circuit 16 closes the switching transistor 19 while pulse width modulating the power transistor 18 to periodically short-circuit the DC motor 24 and reverse the direction of the current while maintaining the polarity of the voltage to charge the battery 26 and brake the DC motor 24.

Figure 4:
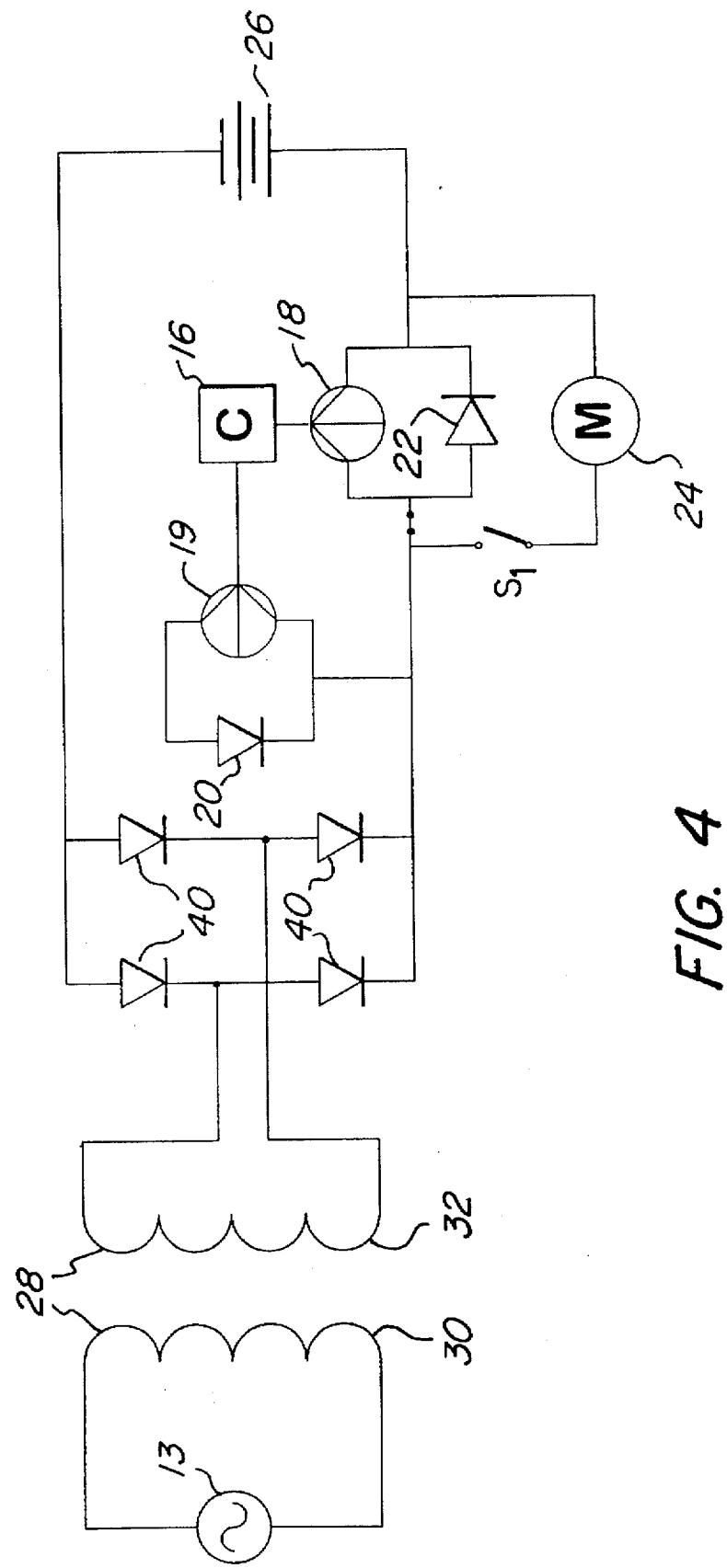
FIG. 4 is a circuit diagram of an alternative embodiment of the integrated charger/controller/regenerator in which a diode bridge rectifies the AC input during the charge mode of operation.

Illustrated in FIG. 4 is an alternative embodiment of the integrated charger/controller/regenerator of the present invention which utilizes diodes 40 connected in a series bridge configuration in place of the high power switching transistors 14 of the PWM circuit to rectify the reduced voltage of the AC power input.

The programmable PWM of the integrated charger/controller circuit allows the programming of various charging characteristics for charging batteries having a variety of characteristics. Accordingly, each battery may utilize a proprietary charging algorithm. In addition, the PWM may also be used as a pulse charger to increase the battery cycle life, or to quick charge the battery.

In comparison to conventional polyphase AC charger/controllers, the charger/controller/regenerator of the present invention requires about two-thirds less components and enables a corresponding cost advantage.

Thus, it can be seen from the foregoing detailed description and attached drawings that the drive assembly of the present invention includes an integrated charger/controller/regenerator which eliminates redundant components of separate chargers and controllers and thereby achieves savings in terms of cost, weight and space. It also enables efficient use of low power batteries and single phase DC motors.

I claim:

1. A drive assembly including (a) a DC electric motor having at least one winding; and (b) an integrated charger/controller/regenerator circuit for controlling said DC electric motor in a drive mode of operation, for charging a battery in a regenerative braking mode of operation, and adapted to be connected to an electric power source for charging an associated battery in a charge mode of operation, said integrated charger/controller/regenerator comprising:

(i) a power module having an output and an input adapted to be connected to the associated electric power source during a charge mode of operation, said power module including a transformer to reduce the input voltage of the power source during a charge mode of operation, said input of said power module being connected to said DC motor during a regenerative braking mode of operation in which said power module provides a DC current to said output;

(ii) a step-up module having an input connected to said power module and an output adapted to be connected to terminals of the battery;

(iii) a control circuit including switch means, said control circuit having (A) a drive mode of operation during which said switch means effects the connection of the terminals of the battery to said input of said power module and said switch means effects the connection of said output of said power module to said DC motor to control said motor;

(B) a regenerative braking mode of operation during which said switch means effects the connection of said DC motor to said input of said power module and said switch means effects the connection of said output of said power module to said input of said step-up module, said output of said step-up module being adapted to be connected to the terminals of the battery for charging thereof; and (C) a charge mode of operation during which said input of said power module is adapted to be connected to the electric power source, said switch means effecting the connection of said output of said power module to said input of said step-up module, said output of said step-up module being adapted to be connected to the terminals of the battery to effect charging thereof, said step-up module including said transformer of said power module, a transistor, and a diode, said transistor being connected in parallel with both said diode and said transformer, said power module including another transistor connected in series with both said diode and said transistor of said step-up module whereby said another transistor controls the DC current output of said DC motor during said regenerative braking mode of operation to charge the battery, said control circuit being independent of said at least one winding of said motor.

2. The drive assembly according to claim 1 wherein said power module includes said transistor of said step-up module, and wherein said transistor is closed and said other transistor is pulse width modulated to control the DC current output of said DC motor during said regenerative braking mode of operation to charge the battery.

3. The drive assembly according to claim 2 wherein said power module is a programmable pulse width modulated converter having power transistors and a parallel/series switching system, said parallel/series switching system connecting said power transistors in series during said charge mode of operation to rectify an AC current input to a DC current output of said power module and said parallel/series switching system connecting said power transistors in parallel with said transistor of said step-up module during said drive mode of operation whereby to control said DC motor.

4. The drive assembly according to claim 2 wherein said power module includes another diode connected in parallel with said other transistor, and said control circuit pulse width modulates said transistor of said step-up module to periodically short circuit said transformer to allow current to flow through said other diode and charge the battery during said charge mode of operation.

5. The drive assembly according to claim 2 wherein said control circuit pulse width modulates said other transistor and closes said transistor of said step-up module to periodically short circuit said DC motor to reverse the direction of the current to charge the battery during said regenerative braking mode of operation.

6. The drive assembly according to claim 1 wherein said transformer is a toroidal transformer.

7. The drive assembly according to claim 1 wherein the voltage of said output of said step-up module is not greater than 100 volts.

* * * * *